A. P. PHILLIPS.
PRESSURE WEIGHING MACHINE.
APPLICATION FILED MAR. 11, 1912.

1,106,839.

Patented Aug. 11, 1914.

3 SHEETS—SHEET 2.

Witnesses:
L. B. Weymouth
H. C. Bowser

Inventor:
Arthur P. Phillips,
by Ralph W. Foster Atty.

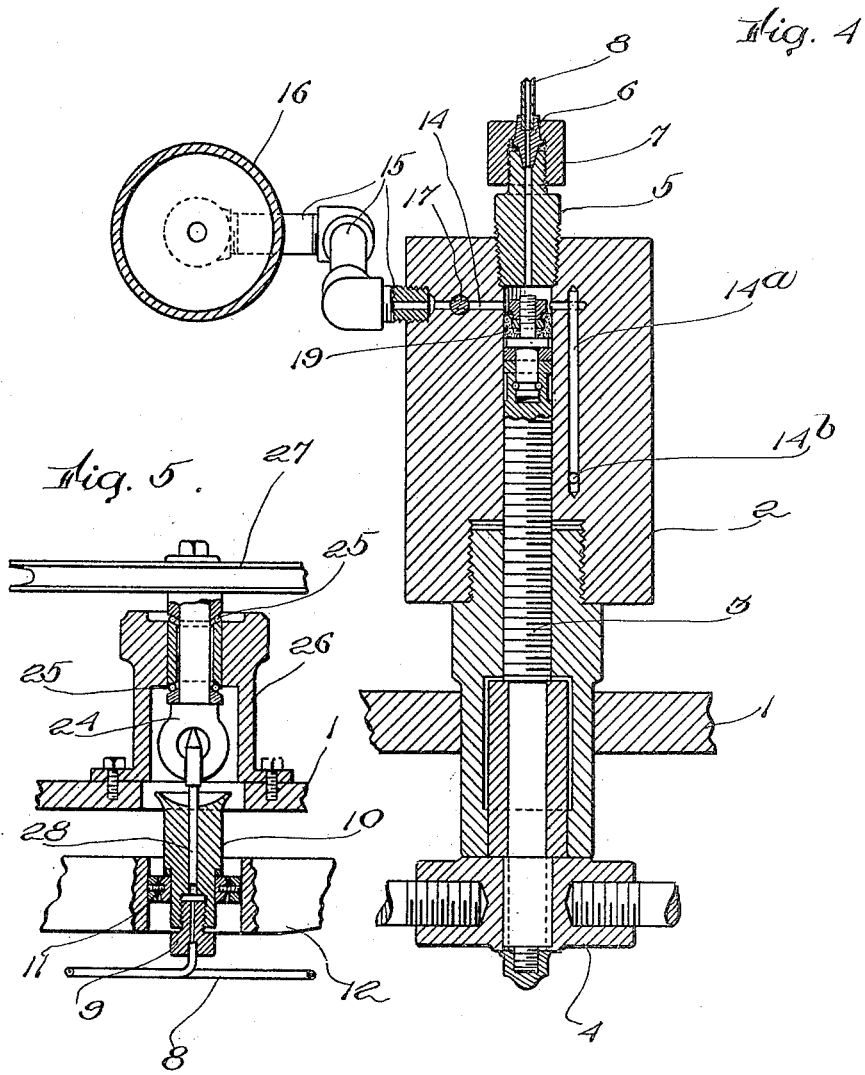

UNITED STATES PATENT OFFICE.

ARTHUR P. PHILLIPS, OF HAVERHILL, MASSACHUSETTS, ASSIGNOR TO CROSBY STEAM GAGE & VALVE COMPANY, OF BOSTON, MASSACHUSETTS, A CORPORATION OF MASSACHUSETTS.

PRESSURE-WEIGHING MACHINE.

1,106,839.

Specification of Letters Patent.

Patented Aug. 11, 1914.

Application filed March 11, 1912. Serial No. 682,926.

*To all whom it may concern:*

Be it known that I, ARTHUR P. PHILLIPS, a citizen of the United States, and resident of Haverhill, in the county of Essex and State of Massachusetts, have invented certain new and useful Improvements in Pressure-Weighing Machines, of which the following is a specification.

My invention relates to pressure-weighing machines and its object is to provide means for introducing into such machines a sufficient amount of the fluid used therein, while preventing the entrance of any air thereinto.

The invention is illustrated by the accompanying drawings in which—

Figure 1:
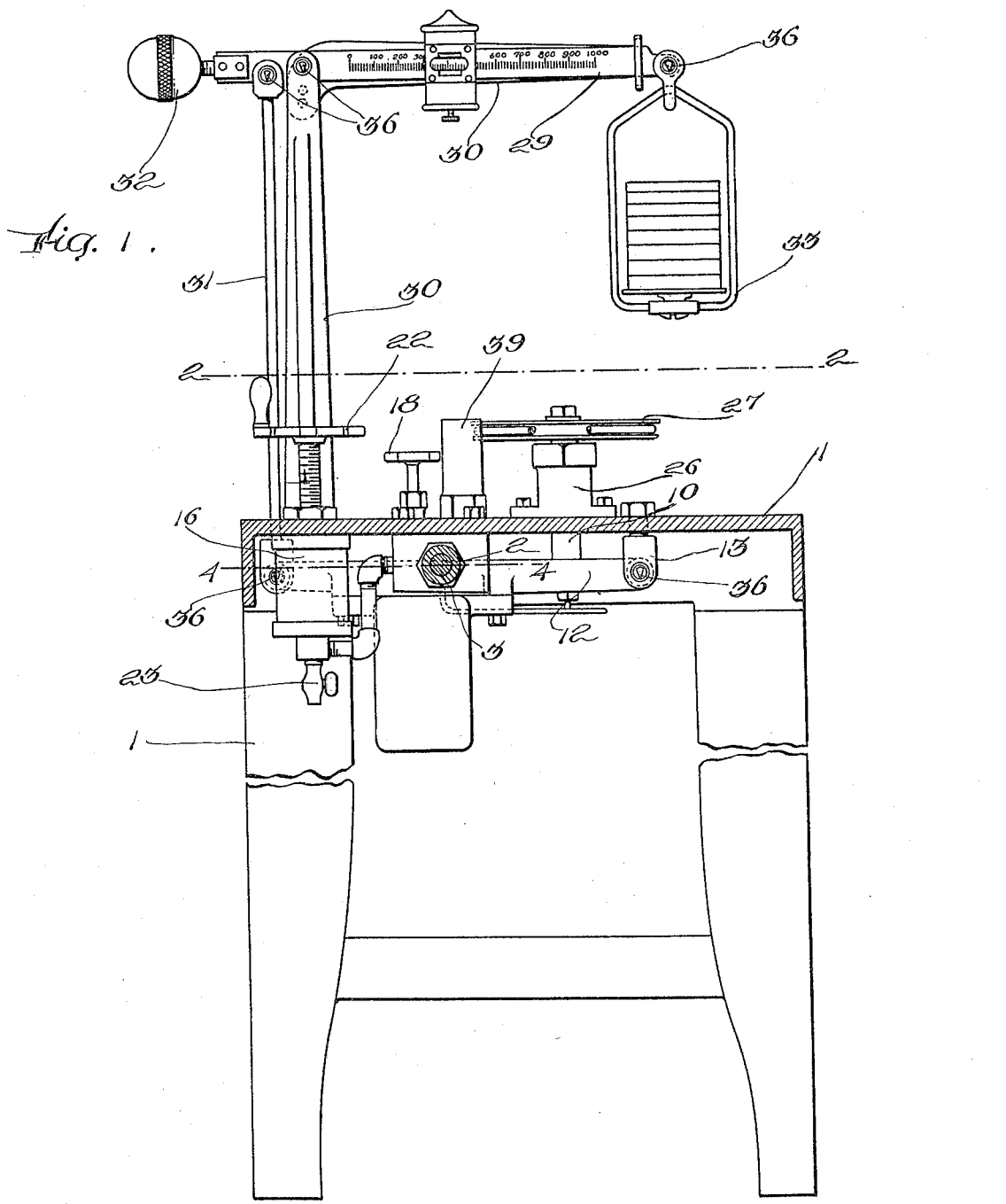
Figure 2:
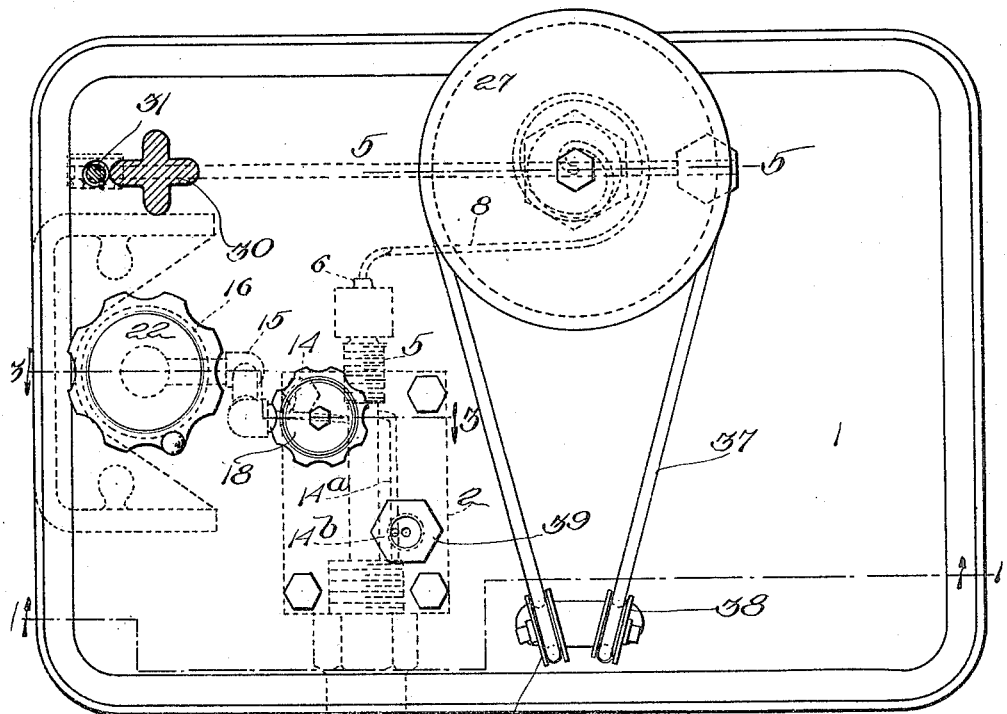
Figure 3:
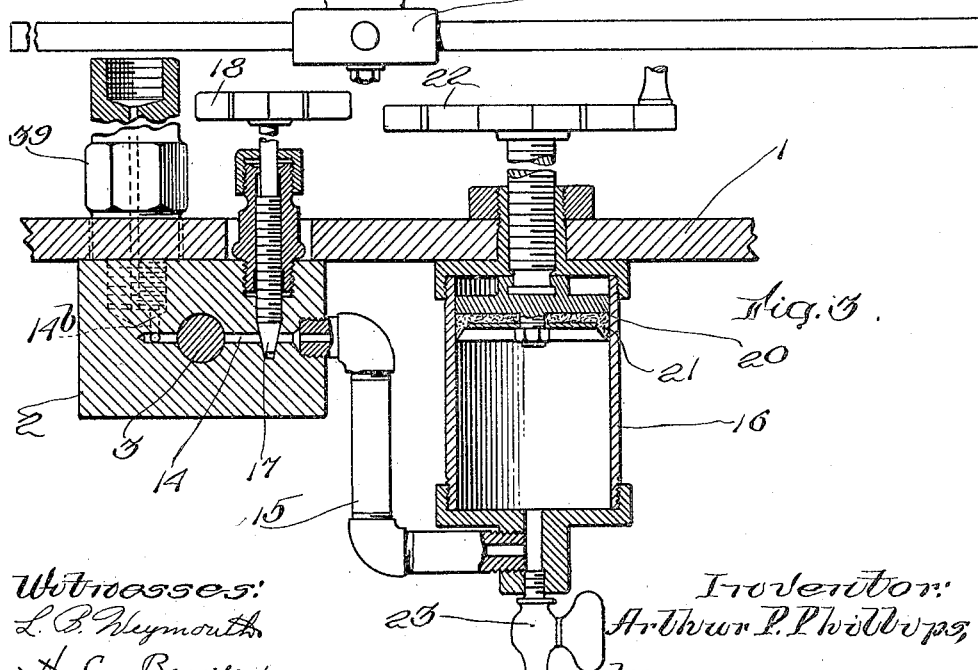

Figure 1 is a vertical section on line 1—1, Fig. 2; Fig. 2 is a horizontal section on line 2—2, Fig. 1; Fig. 3 is a sectional view partly in elevation on line 3—3, Fig. 2; Fig. 4 is a sectional view partly in elevation on line 4—4, Fig. 1; Fig. 5 is a sectional view partly in elevation on line 5—5, Fig. 2.

Similar letters refer to similar parts throughout the several views.

The table 1 supports the mechanism about to be described.

The fluid pressure chamber 2, mounted on table 1, is interiorly threaded to engage the threaded plunger 3 operated by the wheel 4 and is furnished with the perforated threaded bushing 5 in which is mounted the perforated swivel 6 being held therein by the cap 7, to which swivel is soldered one end of the pipe 8, the other end of which is soldered to the perforated threaded bushing 9 screwed into the cylinder 10 mounted on gimbals 11 disposed in the lever 12 fulcrumed on the stud 13 fixed to table 1. In this way communication is provided between the pressure chamber 2 and cylinder 10. The pressure chamber 2 is furnished also with the passage 14 leading therefrom by the pipe 15 attached to said chamber into the fluid reservoir chamber 16 mounted on table 1, and also with passage 14ª, 14ᵇ connecting with the pipe 39 hereinafter described. The stop valve 17, mounted in pressure chamber 2 and operated by the wheel 18 fixed to said valve is adapted to open and close the passage 14, thereby shutting off communication between the pressure chamber and the reservoir chamber. The plunger 3 is furnished on its inner end with the cup shaped packing 19 of elastic material. The reservoir chamber 16 is likewise furnished with the plunger 20 furnished in turn with the cup shaped packing 21 of elastic material and with the operating wheel 22; said reservoir chamber is furnished also with the drain cock 23.

The forked shaft 24 rotates on ball bearings 25 in the bracket 26 mounted on table 1 and is rotated by the wheel 27 fixed to its upper end. The cylinder 10 is furnished with a piston 28, the upper end of which is engaged and rotated by the forked shaft 24. The scale beam 29 is mounted upon the vertical standard 30 fixed to table 1 and is operated by the link 31 by which it is connected with lever 12; said scale beam 29 is furnished with the counterbalance 32 and its outer end extends through the slotted outer end of the vertical standard 30 which acts as a stop for said beam and is adapted to carry the weight hanger 33. The bearings 36 are preferably of steel and knife-edged.

The wheel 27 which rotates the forked shaft 24 is rotated by a motor (not shown) with which it is connected by belt 37 passing over pulleys 38. The pipe 39 is mounted in pressure chamber 2 and furnishes an opening for introducing the fluid into passage 14ᵇ in said chamber as well as a support to which may be attached the instrument to be tested.

The operation of the machine is as follows: Plungers 3 and 20 are screwed into their respective chambers 2 and 16; the valve 17 is raised or removed to afford communication between the fluid pressure chamber and the reservoir chamber; the drain cock 23 is opened and the pipe 39 is opened to permit the introduction of oil into the system. The operator pours oil into the pipe 39 until the entire system is filled when he closes the drain cock; he then continues pouring oil, while at the same time raising plunger 20 in the reservoir chamber, until said chamber is filled; he then attaches the instrument to be tested to pipe 39; he then withdraws plunger 3 in the fluid pressure chamber, at the same time lowering plunger 20 in the reservoir chamber, thus causing the oil to follow closely the first named plunger and fill the fluid pressure chamber without admitting air into the system; he then closes valve 17, thereby shutting off communication between the fluid pressure chamber and the reservoir chamber; having adjusted the weight adapted to measure the desired test, say 1000 pounds, he screws the plunger 3 into the fluid pressure chamber, thereby exerting a continually increasing pressure on the oil, which, inasmuch as piston 28 in cylinder 10 is prevented by forked shaft 24 from moving upwardly, moves said cylinder downwardly, thereby depressing lever 12 and therethrough and through link 31 exerting downward pressure on the inner end of scale beam 29 and he continues screwing plunger 3 into the fluid chamber until such downward pressure balances the weight, when the test is completed. Before removing the instrument which has been tested, the valve is raised and the plunger in the reservoir chamber is also raised to permit the oil under pressure to rise therein until the pressure ceases, thus permitting the oil to leave the instrument. While the machine is in operation, as described, the forked shaft 24 is rotated by the motor (not shown) in order to diminish friction.

The machine which constitutes the subject of the present invention is an improvement on that shown and described in patent to Reed No. 748,010 dated Dec. 29, 1903, differing therefrom chiefly in the additional element of the reservoir chamber, with its plunger, normally communicating with the fluid pressure chamber, with means for closing such communication, all substantially as described.

I claim:

1. A pressure-weighing machine comprising, in combination, a main support; a pressure chamber mounted thereon; a reservoir chamber mounted on said support; means forming a valve controlled passage connecting said chambers; said valve; threaded plungers mounted in said chambers; wheels for operating said plungers; a lever fulcrumed on said support; a scale beam mounted on said support; a link connecting said lever with said scale beam; a cylinder mounted on gimbals disposed in said lever; a piston mounted in said cylinder; a forked shaft mounted on said support and engaging said piston; means for rotating said shaft; a pipe connecting said cylinder with said pressure chamber; and a tubular support leading into said pressure chamber.

2. A pressure-weighing machine comprising, in combination, a pressure chamber; a reservoir chamber; means forming a valve controlled passage connecting said chambers; said valve; plungers mounted in said chambers; means for operating said plungers; a tubular support leading into said pressure chamber; a movable cylinder; a pipe connecting said cylinder with said pressure chamber; a piston mounted in said cylinder and having a limited movement therein; a scale; and intermediate mechanism actuated by said cylinder and actuating said scale.

3. A pressure-weighing machine comprising, in combination, a pressure chamber; a reservoir chamber; means forming a valve controlled passage connecting said chambers; said valve; plungers mounted in said chambers; means for operating said plungers; a tubular support leading into said pressure chamber; a scale; and intermediate mechanism adapted to be actuated by fluid under pressure in said pressure chamber and to actuate said scale.

In testimony whereof I have affixed my signature, in presence of two witnesses.

ARTHUR P. PHILLIPS.

Witnesses:
  RALPH W. FOSTER,
  ETHEL W. FAXON.

---

Copies of this patent may be obtained for five cents each, by addressing the "Commissioner of Patents, Washington, D. C."